United States Patent
Hozumi et al.

(10) Patent No.: US 10,138,380 B2
(45) Date of Patent: Nov. 27, 2018

(54) WATER/OIL REPELLANT COATING FILM AND MANUFACTURING METHOD THEREOF

(71) Applicants: NATIONAL INSTITUTE OF ADVANCED INDUSTRIAL SCIENCE AND TECHNOLOGY, Tokyo (JP); Atsushi Hozumi, Aichi (JP); Chihiro Urata, Aichi (JP)

(72) Inventors: Atsushi Hozumi, Aichi (JP); Chihiro Urata, Aichi (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 15/119,437

(22) PCT Filed: Feb. 19, 2015

(86) PCT No.: PCT/JP2015/054626
§ 371 (c)(1),
(2) Date: Aug. 17, 2016

(87) PCT Pub. No.: WO2015/125866
PCT Pub. Date: Aug. 27, 2015

(65) Prior Publication Data
US 2017/0015842 A1    Jan. 19, 2017

(30) Foreign Application Priority Data
Feb. 21, 2014  (JP) .................................. 2014-032316

(51) Int. Cl.
  C09D 5/16 (2006.01)
  C09D 183/04 (2006.01)
  B32B 27/28 (2006.01)
  C08G 77/00 (2006.01)

(52) U.S. Cl.
  CPC ......... *C09D 5/1681* (2013.01); *C09D 183/04* (2013.01); *B32B 27/283* (2013.01); *C08G 77/70* (2013.01)

(58) Field of Classification Search
  CPC .......................... C09D 183/04; B32B 27/283
  See application file for complete search history.

(56) References Cited

U.S. PATENT DOCUMENTS

| | | | | |
|---|---|---|---|---|
| 2,397,895 A * | 4/1946 | Warrick | ................. | C08G 77/06 528/10 |
| 3,450,672 A * | 6/1969 | Merrill | ................... | C08G 77/06 524/356 |
| 3,634,321 A * | 1/1972 | Nugent | ................. | B01J 19/1887 159/49 |
| 4,322,476 A * | 3/1982 | Molari, Jr. | ........ | B32B 17/10018 428/412 |
| 4,895,286 A * | 1/1990 | DeRosa | ................. | F16M 13/04 224/265 |
| 7,351,477 B2 * | 4/2008 | Yamaya | ............... | C09D 5/1625 106/287.16 |
| 7,785,715 B2 * | 8/2010 | Tsumura | ............... | C08F 283/00 428/447 |
| 2002/0015800 A1 | 2/2002 | Miyamoto et al. | | |
| 2002/0064663 A1 * | 5/2002 | Murphy | ................ | C03C 17/009 428/447 |
| 2004/0152825 A1 | 8/2004 | Yamamoto et al. | | |
| 2005/0227092 A1 | 10/2005 | Yamaya et al. | | |
| 2007/0009657 A1 * | 1/2007 | Zhang | .................. | C09D 183/04 427/180 |
| 2007/0141305 A1 | 6/2007 | Kasai et al. | | |
| 2008/0064814 A1 | 3/2008 | Yamamoto et al. | | |
| 2008/0090004 A1 * | 4/2008 | Zhang | ...................... | C09D 4/00 427/180 |
| 2011/0165808 A1 * | 7/2011 | Zimmermann | .......... | C09D 4/00 442/81 |
| 2013/0340992 A1 | 12/2013 | Akinaga et al. | | |

FOREIGN PATENT DOCUMENTS

| | | |
|---|---|---|
| CN | 103443223 | 12/2013 |
| EP | 0565743 | 10/1993 |
| JP | H05-148451 | 6/1993 |
| JP | H06-032991 | 2/1994 |
| JP | H07-048560 | 2/1995 |
| JP | H07-161453 | 6/1995 |
| JP | H09-157636 | 6/1997 |
| JP | H10-326559 | 12/1998 |
| JP | H11-092714 | 4/1999 |
| JP | H11-218926 | 8/1999 |

(Continued)

OTHER PUBLICATIONS

International Search Report dated May 26, 2015.
(Continued)

*Primary Examiner* — Marc S Zimmer
(74) *Attorney, Agent, or Firm* — IPUSA, PLLC (57) ABSTRACT

In an aspect of the present invention, there is provided a water/oil repellent coating film, the water/oil repellent coating film being formed on a surface of a solid object, wherein the water/oil repellent coating film is terminated with a group expressed by chemical formula (A) and a three-dimensional crosslinking structure of siloxane bond is formed.

[math. 1]

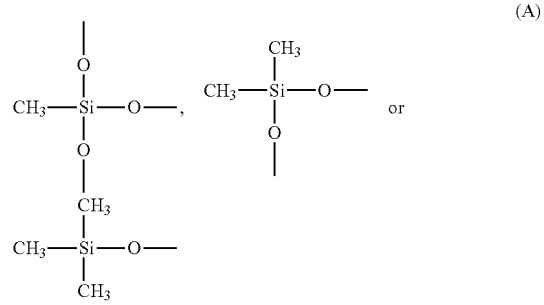

(A)

2 Claims, 5 Drawing Sheets

(56) References Cited

FOREIGN PATENT DOCUMENTS

| | | |
|---|---|---|
| JP | 2000-017229 | 1/2000 |
| JP | 2000-080354 | 3/2000 |
| JP | 2000-182513 | 6/2000 |
| JP | 2000-195415 | 7/2000 |
| JP | 2005-120236 | 5/2005 |
| JP | 2009-521551 | 6/2009 |
| JP | 2010-222703 | 10/2010 |
| JP | 2010-248468 | 11/2010 |
| JP | 2011-111509 | 6/2011 |
| JP | 2012-017394 | 1/2012 |
| JP | 2012-214588 | 11/2012 |
| JP | 2013-155375 | 8/2013 |
| JP | 2013-173939 | 9/2013 |
| KR | 10-2006-0045524 | 5/2006 |
| WO | 2012/137976 | 10/2012 |

OTHER PUBLICATIONS

L. Gao and T. J. McCarthy, Langmuir, 22, 6234 (2006).
"Transparent film having excellent oil repellency" <online> Mar. 13, 2012, Advanced Industrial Science and Technology, <URL: http://www.aist.go.jp/aist_i/press_release/pr2012/pr20120313/pr20120313.html>.
C. Urata, D. F. Cheng, B. Masheder and A. Hozumi, RSC Adv., 2, 9805 (2012).
Extended European Search Report dated Dec. 9, 2016.
Chinese Official Action for 201580009221.8 dated Apr. 12, 2017.
Korean Official Action for 10-2016-7025075 dated Dec. 13, 2017.
Japanese Official Action for 2014-032316 dated Mar. 13, 2018.

* cited by examiner

EMBODIMENT 1   COMPARATIVE EXAMPLE 4

WATER/OIL REPELLANT COATING FILM AND MANUFACTURING METHOD THEREOF

TECHNICAL FIELD

An aspect of the present invention relates to manufacturing methods of water/oil repellent coating film and manufacturing methods of precursor solution thereof.

BACKGROUND ART

Upon a droplet adhering to a surface of a solid object, corrosion, deterioration, and pollution may expand from the adhered point. For example, an exhaust pipe of an engine is continuously exposed to high temperature air. Meanwhile it is known that rusting is occurred from a point at which a water droplet is adhered if the water droplet is adhered or condensation is occurred when temperature of the exhaust pipe is low. Further, if oil adhered to a solid subject is continued to be exposed to high temperature air, the oil is carbonized and adheres with a high strength. Therefore, visibility may be decreased and choke may occur. Therefore, in various fields of engineering, material and surface treatment is tried to be developed, which makes it possible to prevent deterioration of capability for removing droplets over a long period of time even in a high-temperature environment.

Recently, importance is placed on dynamic motion of the droplet (dynamic wettability) on the surface of the solid object as an index of capability of removing droplets, which can be evaluated by using contact angle hysteresis (e.g. Patent Document 1 and Non-Patent Document 1). The contact angle hysteresis is indicated by a difference ($\theta_A - \theta_R$) between an advance contact angle ($\theta_A$) and a sweepback contact angle ($\theta_R$), and the droplet slips on the surface of he solid object with a slight tilt as the value of the contact angle hysteresis becomes smaller. That is, the surface of the solid object whose contact angle hysteresis is small has an excellent capability for removing the droplets. On the other hand, the droplet is pinned at the surface of the solid object whose contact angle hysteresis is great even if the surface is super-water-repellent whose static contact angle exceeding 150°.

In non-patent documents 2 and 3, it is disclosed that a mixed solution of decyltriethoxysilane and tetramethoxysilane is coated on respective substrate, and a transparent film can be obtained when the solution is dried under normal temperature.

CITATION LIST

Patent Document

[Patent Document 1]: Japanese Laid-open Patent Publication No. 2010-222703 [Non-Patent Document]
[Non-Patent Document 1]: L. Gao and T. J. McCarthy, Langmuir, 22, 6234 (2006)
[Non-Patent Document 2]: "transparent film having excellent oil repellency" <online>Mar. 13, 2012, Advanced Industrial Science and Technology, <URL: http://www.aist.go.jp/aist_j/press_release/pr2012/pr20120313/pr20120313.html>
[Non-Patent Document 3]: C. Urata, D. F. Cheng, B. Masheder and A. Hozumi, RSC Adv., 2, 9805 (2012)

SUMMARY OF INVENTION

Technical Problem

However, further improvement of water/oil repellency of coating film is expected.

An object of an aspect of the present invention is to provide a water/oil repellant coating film having excellent heat tolerance and water/oil repellency.

Solution to Problems

An aspect of the present invention is, a water/oil repellant coating film, the water/oil repellant coating film being formed on a surface of a solid object, wherein the water/oil repellant coating film is terminated with a group expressed by chemical formula (A) and a three-dimensional crosslinking structure of siloxane bond is formed.

[math. 1]

(A)

Another aspect of the present invention is, a method for producing a water/oil repellant coating film, the method comprising:

producing a precursor solution by dissolving organic silane compound in organic solvent;

coating the precursor solution on a surface of a solid object, wherein the organic silane compound is any one of compounds expressed by general formula (B)

[math. 2]

$$(CH_3)_{4-n}SiR_n \tag{B}$$

(wherein n is any one of 1, 2, and 3, and R is any one of alkoxy group, chloro group, and acetoxy group whose carbon number is equal to or less than 6.), expressed by general formula (C)

[math. 3]

$$R^1\text{—}O\text{—}(Si(CH_3)_2\text{—}O)_m R^2 \tag{C}$$

(wherein m indicates a polymerization degree, and R1 and R2 are any of group and hydrogen atom respectively and independently expressed by general formula

[math. 4]

$$(CH_3)_{3-n}R_nSi\text{—}$$

(wherein n is any one of 1 and 2, and R is any one of alkoxy group, chloro group, and acetoxy group whose carbon number is equal to or less than 6.)), expressed by general formula (D)

[math. 5]

$$R^1\text{—}O\text{—}(\text{SiH}(CH_3)\text{—}O)_m\text{—}R^2 \quad (D)$$

(wherein m indicates a polymerization degree, and R1 and R2 are any of group and hydrogen atom respectively and independently expressed by general formula

[math. 6]

$$(CH_3)_{3-n}R_n\text{Si—}$$

(wherein n is any one of 1 and 2, and R is any one of alkoxy group, chloro group, and acetoxy group whose carbon number is equal to or less than 6.)), and
expressed by general formula (E)

[math. 7]

(E)

(wherein m indicates a polymerization degree.).

Another aspect of the present invention is, a method for producing a water/oil repellant coating film, the method comprising:

causing gas or liquid organic silane compound to adhere to a surface of a solid object; wherein the organic silane compound is any one of compounds expressed by general formula (B)

[math. 8]

$$(CH_3)_{4-n}\text{SiR}_n \quad (B)$$

(wherein n is any one of 1, 2, and 3, and R is any one of alkoxy group, chloro group, and acetoxy group whose carbon number is equal to or less than 6.),
expressed by general formula (C)

[math. 9]

$$R^1\text{—}O\text{—}(\text{Si}(CH_3)_2\text{—}O)_m\text{—}R^2 \quad (C)$$

(wherein m indicates a polymerization degree, and R1 and R2 are any of group or hydrogen atom respectively and independently expressed by general formula

[math. 10]

$$(CH_3)_{3-n}R_n\text{Si—}$$

(wherein n is any one of 1 and 2, and R is any one of alkoxy group, chloro group, and acetoxy group whose carbon number is equal to or less than 6.)),
expressed by general formula (D)

[math. 11]

$$R^1\text{—}O\text{—}(\text{SiH}(CH_3)\text{—}O)_m\text{—}R^2 \quad (D)$$

(wherein m indicates a polymerization degree, and R1 and R2 are any of group and hydrogen atom respectively and independently expressed by general formula

[math. 12]

$$(CH_3)_{3-n}R_n\text{Si—}$$

(wherein n is any one of 1 and 2, and R is any one of alkoxy group, chloro group, and acetoxy group whose carbon number is equal to or less than 6)), and expressed by general formula (E)

[math. 13]

(E)

(wherein m indicates a polymerization degree.).

Another aspect of the present invention is,

A method for producing a precursor solution by dissolving organic silane compound in organic solvent, wherein the organic silane compound is any one of compounds expressed by general formula (B)

[math. 14]

$$(CH_3)_{4-n}\text{SiR}_n \quad (B)$$

(wherein n is any one of 1, 2, and 3, and R is any one of alkoxy group, chloro group, and acetoxy group whose carbon number is equal to or less than 6),
expressed by general formula (C)

[math. 15]

$$R^1\text{—}O\text{—}(\text{Si}(CH_3)_2\text{—}O)_m\text{—}R^2 \quad (C)$$

(wherein m indicates a polymerization degree, and R1 and R2 are any of group and hydrogen atom respectively and independently expressed by general formula

[math. 16]

$$(CH_3)_{3-n}R_n\text{Si—}$$

(wherein n is any one of 1 and 2, and R is any one of alkoxy group, chloro group, and acetoxy group whose carbon number is equal to or less than 6.)),
expressed by general formula (D)

[math. 17]

$$R^1\text{—}O\text{—}(\text{SiH}(CH_3)\text{—}O)_m\text{—}R^2 \quad (D)$$

(wherein m indicates a polymerization degree, and R1 and R2 are any of any of group and hydrogen atom respectively and independently expressed by general formula

[math. 18]

$$(CH_3)_{3-n}R_n\text{Si—}$$

(wherein n is any one of 1 and 2, and R is any one of alkoxy group, chloro group, and acetoxy group whose carbon number is equal to or less than 6.)), and
expressed by general formula (E)

[math. 19]

(E)

(wherein m indicates a polymerization degree).

Advantageous Effects of Invention

According to an aspect of the present invention, a water/oil repellant coating film having excellent heat tolerance and water/oil repellency can be provided.

DESCRIPTION OF EMBODIMENTS

In the following, embodiments of the present invention will be described with reference to accompanying drawings.

A water/oil repellant coating film is formed on a surface of a solid object. The water/oil repellant coating film is terminated with a group expressed by chemical formula (A), and a three-dimensional crosslinking structure of siloxane bond is formed. Thus, the group expressed by chemical formula (A) exists on the surface of the water/oil repellant coating film.

The root mean square surface roughness Rq of the water/oil repellant coating film is normally equal to or less than 50 nm, preferably equal to or less than 1 nm, and further preferably equal to or less than 0.5 nm. If the root mean square surface roughness Rq of the water/oil repellant coating film exceeds 50 nm, water repellency or transparency is reduced.

The group expressed by chemical formula (A) has an excellent heat tolerance greater than or equal to 450° C. in the atmosphere. Therefore, the water/oil repellant coating film can maintain the capability up to 450° C.

In the water/oil repellant coating film, preferably, enough space is provided between methyl groups existing on the surface thereof. In this case, rotation of the methyl groups existing on the surface is not disturbed.

A mole ratio of alkoxy groups and hydroxyl groups with respect to the methyl groups existing on the surface of the water/oil repellant coating film is normally equal to or less than 0.1, preferably equal to or less than 0.05, and more preferably, alkoxy groups and hydroxyl groups do not exist on the surface. If the mole ratio of alkoxy groups and hydroxyl groups with respect to the methyl groups existing on the surface of the water/oil repellant coating film exceeds 0.1, the water/oil repellency of the water/oil repellant coating film may be reduced.

Additionally, the mole ratio of alkoxy groups and hydroxyl groups with respect to the methyl groups existing on the surface of the water/oil repellant coating film can be calculated by using formula of Cassie.

In order to achieve excellent water/oil repellency of the water/oil repellant coating film, mobility of the methyl groups existing on the surface of the water/oil repellant coating film needs to be "Liquid-like". Hence, the space for enabling rotation of the methyl groups is required.

For example, in a case where phenyl groups exist on the surface instead of the methyl groups, the mobility does not become "Liquid-like" because the phenyl groups are likely to densely aggregate due to n-n interaction.

Also, in a case where alkoxy groups and hydroxyl groups greater than or equal to a predetermined amount exist on the surface of the film, droplet slip-down properties may be reduced where a position at which alkoxy groups and hydroxyl groups greater than or equal to a predetermined amount exist is starting point.

Further, in a case where alkoxy groups exist on the surface of the film and heated to temperature greater than or equal to 150° C., the alkoxy groups may be separated as alcohol and silanol groups may be generated.

In order to suppress exposure of hydroxyl groups or alkoxy groups on the surface, preferably, hydrolysis and condensation polymerization in precursor solution (described below) are sufficiently performed.

Preferably, the water/oil repellant coating film does not contain any organic group other than the methyl groups included in the group expressed by chemical formula (A). In the film containing organic group other than the methyl groups included in the group expressed by chemical formula (A), the organic group may be thermally decomposed to make the surface rough, or to cause pollution of the surface due to the thermally decomposed products when the film is exposed to high temperature.

A ratio of transparency of a solid object whose surface is not coated by the water/oil repellant coating film with respect to a transparency of the solid object whose surface is coated by the water/oil repellant coating film is normally greater than or equal to 0.95.

The water/oil repellant coating film is preferably chemically bound with the surface of the solid object. In this case, adhesiveness of the water/oil repellant coating film can be improved.

Non-limiting examples of the slid object are metal, metal oxide, composition metal, semiconductor, polymer, ceramics, and glass.

Non-limiting examples of shape of the surface of the solid object are a planar surface, a curved surface, a concave-convex surface, and a porous surface, where two or more shapes may be used.

The water/oil repellant coating film has an excellent flexibility. Therefore, clacks and peeling can be suppressed even when polymer film coating, metal foil coating, etc., are provided.

The water/oil repellant coating film can be formed by coating the precursor solution on the surface of the solid object or by causing gas or liquid organic silane compound to adhere to the surface of the solid object, where the precursor solution is produced by dissolving organic silane compound in organic solvent. Here, the organic silane compound is a compound expressed by general formula (B), general formula (C), general formula (D), or general formula (E).

Additionally, the organic silane compound may be hydrolyzed or condensedly polymerized in producing the precursor solution.

The solid object on which the precursor solution is coated normally causes solvent to be volatilized under the atmosphere pressure and causes the organic silane compound to be cross-linked.

Temperature for volatilizing the solvent is normally 0-100° C., and preferably 15-30° C.

Time for volatilizing the solvent is normally 0-60 seconds, and preferably 0-15 seconds.

Also, the solid object is normally heated under the atmosphere pressure to cause the organic silane compound to be cross-linked, where the organic silane compound is adhered to the surface of the solid object.

Temperature for heating the solid object is normally 50-500° C., and preferably 100-350° C.

In a case where the solid object is polymer, preferably, the precursor solution is coated on the surface of the solid object or gas or liquid organic silane compound is caused to be adhered to the surface of the solid object after performing a preprocessing on the surface of the solid object by using oxygen plasma, ozone, ultraviolet rays, vacuum ultraviolet rays, etc., so as to further improve the adhesiveness.

The organic solvent preferably has a steam pressure greater than that of water.

Any organic solvent may be chosen as long as the solvent is water-miscible and capable of solving the organic silane compound and polycondensate thereof. Methanol, ethanol, isopropanol, tetrahydrofuran, and acetone can be exemplified. Non-protic solvent is preferably used because protic solvent may remain on the surface of the water/oil repellant coating film as alkoxy groups.

The precursor solution preferably includes catalyst capable of fostering hydrolysis of the organic silane compound. Speed of condensation polymerization can be controlled by using the catalyst. Therefore, the precursor solution, whose pot life is greater than or equal to 30 days under a normal temperature, can be prepared. Such a precursor solution can be used after leaving more than 30 days under the normal temperature since condensation polymerization speed of silanol group is decreased in the precursor solution.

Non-limiting examples of the catalyst are hydrogen chloride, acetic acid, and phosphoric acid.

Non-limiting examples of coating method are a spin coating method, a dip coating method, a roller coating method, a bar coating method, an inkjet coating method, a gravure coating method, a spray method, a dispenser method, a nozzle coating method, a slit coating method, a diquat method, a blade coating method, a knife coating method, a wire bar coating method, and a screen printing method.

A thickness of the water/oil repellant coating film can be controlled by adjusting concentration of the organic silane compound in the precursor solution.

Additionally, the water/oil repellant coating film may be formed by coating a mixture solution of the precursor solution and a solution prepared by hydrolyzing and condensedly polymerizing metalalkoxide in an organic solution containing dissolved metalalkoxide on the surface of the solid object. Or the water/oil repellant coating film may be formed by coating a mixture solution of the precursor solution and a solution prepared by dissolving perhydropolysilazane in an organic solution on the surface of the solid object.

A non-limiting example of metalalkoxide is expressed by a general formula described below.

[math. 20]

M(OR)$_n$ (Wherein n is integer number of 0-4, M is Al, Hf, Si, Ti, Sn, or Zr, and R is alkyl group whose carbon number is 1-15.)

Perhydropolysilazane is expressed by a general formula described below.

[math. 21]

(Wherein m is polymerizing degree.)

The thickness of the water/oil repellant coating film is normally 10 nm-10 μm, and preferably 200 nm-1 μm.

The water/oil repellant coating film causes contact angle hysteresis with respect to a liquid, whose surface tension is 18-73 dyn/cm, to be equal to or less than 10° and enables a droplet greater than or equal to 5 μL to slip with a falling angle equal to or less than 10°.

Additionally, the contact angle hysteresis can be calculated by a formula described below, wherein advance contact angle is $\theta_A$ (°) and a sweepback contact angle is $\theta_R$ (°).

$$\theta_A - \theta_R$$

Non-limiting examples of the liquid, whose surface tension is 18-73 dyn/cm, are n-pentan, n-hexan, ethanol, methanol, silicone oil, acetone, benzene, n-hexadecane, ethylene glycol, iodomethane, and water.

Also, the water/oil repellant coating film has an excellent adhesiveness to the surface of the solid object because silanol group generated by hydrolyzing organic silane compound has a high reactivity.

Normally, the polycondensate of the organic silane compound does not include coupling scheme other than siloxane bond (Si—O bond), C—Si bond, and C—H bond. Therefore, capability of the water/oil repellant coating film for removing droplets is not reduced even if the water/oil repellant coating film is heated at 450° C. for one hour or more under the atmosphere pressure. Also, the capability of the water/oil repellant coating film for removing droplets is not reduced even if the water/oil repellant coating film is heated at 350° C. for twenty four hours or more under the atmosphere pressure.

The water/oil repellant coating film has excellent heat tolerance and adhesiveness. Therefore, the capability of the water/oil repellant coating film for removing droplets is not reduced even if the water/oil repellant coating film is dipped in a liquid, whose surface tension is 18-73 dyn/cm and whose temperature is equal to or less than boiling temperature, for 24 hours or more.

The surface tension of droplet significantly changes according to temperature change. Therefore, static contact angle of the water/oil repellant coating film with respect to a liquid is reversibly changed when the liquid, whose surface tension is 18-73 dyn/cm, is repeatedly heated and cooled under the temperature equal to or less than boiling temperature.

The surface tension and viscosity of the liquid decreases when the liquid, whose surface tension is 18-73 dyn/cm, is repeatedly heated and cooled under the temperature equal to or less than boiling temperature. Therefore, the droplet slip-down properties on the water/oil repellant coating film increases (falling angle is decreased).

The water/oil repellant coating film has an excellent plasticity. Therefore, the droplet slip-down properties are not degraded even if repeated bending is performed 50 times or more.

In a case where the water/oil repellant coating film is horizontally placed and temperature gradient within a range between freezing temperature and boiling temperature of the liquid, whose surface tension is 18-73 dyn/cm, is applied, Marangoni convection occurs due to gradient of surface tension at the interface of the liquid, and the droplet moves voluntarily.

Therefore, for example, the water/oil repellant coating film can provide lubricity in an engine of vehicle, which is exposed to high temperature for a long period of time, and the like. Also, the water/oil repellant coating film can prevent corrosion of an exhaust pipe/metal material. Further, the water/oil repellant coating film can improve visibility of transparent window in an oil pump. Also, the water/oil repellant coating film can prevent creeping-up of flux, adhesion of oil spot to a distillation column, smear of a frying pan. Further, the water/oil repellant coating film can applied to an actuator using movement of droplet, and the like.

EMBODIMENTS

In the following, specific embodiments of the present invention will be described. However, the embodiments are not limiting examples. Additionally, "part" means mass part.

First Embodiment

The precursor solution is produced by mixing 33 parts of methyl triethoxysilane, 5 parts of 0.01M-hydrochloric acid and 62 parts of ethanol, then stirring under room temperature for 24 hours.

A test piece is obtained by coating, in a spin coating method, the precursor solution on a stainless steel sheet (SUS304) and a polyimide film, then heating in an oven at 100° C. for 24 hours to form the water/oil repellant coating film whose thickness is 800 nm and whose root mean square surface roughness Rq is equal to or less than 0.3 nm.

Figure 1:
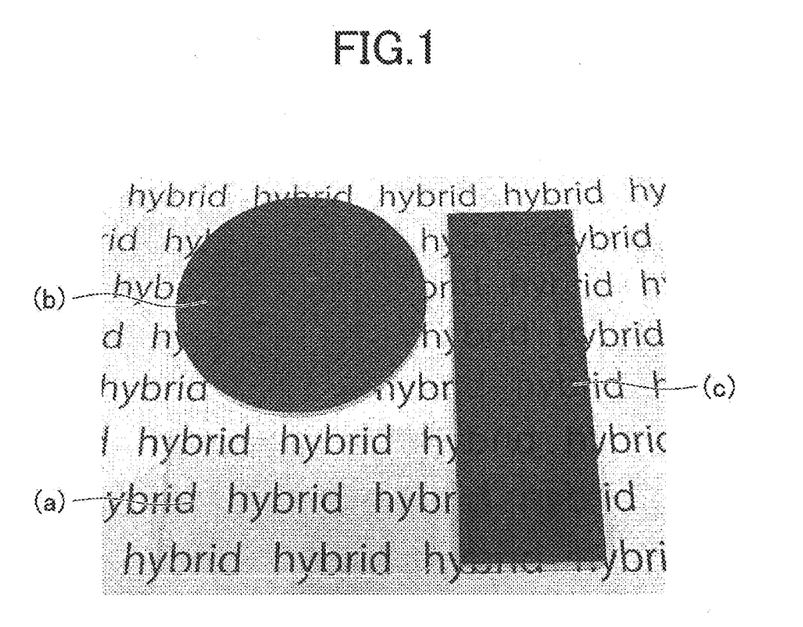
FIG. 1 is a photographic image illustrating appearance of a first embodiment.

FIG. 1 is a diagram illustrating an appearance of the test piece. Additionally, (a), (b), and (c) depicted in FIG. 1 are respectively show a glass sheet, a stainless sheet, and a polyimide film.

According to FIG. 1, the water/oil repellant coating film of the first embodiment has excellent transparency and adhesiveness.

Comparative Example 1

The precursor solution is produced by mixing 20 parts of tetramethoxysilane, 4.5 parts of decyltriethoxysilane, 65 parts of ethanol and 10 parts of 0.01M-hydrochloric acid, then stirring under room temperature for 24 hours.

A test piece is obtained by coating, in a spin coating method, the precursor solution on a glass sheet and a stainless steel sheet (SUS304), then being placed under room temperature for 24 hours to form the water/oil repellant coating film whose thickness is 700 nm and whose root mean square surface roughness Rq is 1.1 nm.

Comparative Example 2

The precursor solution is produced by mixing 7.8 parts of tetramethoxysilane (heptadecafluoro-1,1,2,2,-tetrahydrodecyl), 3.9 parts of trimethoxysilane FAS17 (produced by "GELEST"), 84 parts of isopropanol, and 4 parts of 0.01M-hydrochloric acid, then stirring under room temperature for 24 hours.

A test piece is obtained by coating, in a spin coating method, the precursor solution on a glass sheet, then being placed under room temperature for 24 hours to form the water/oil repellant coating film whose thickness is 500 nm and whose root mean square surface roughness Rq is 0.82 nm.

Comparative Example 3

The stainless sheet (SUS304) of the first embodiment is used as a test piece.

Comparative Example 4

The polyimide film of the first embodiment is used as a test piece.

<Root Mean Square Surface Roughness Rq>

The root mean square surface roughness Rq is calculated based on an image obtained through AFM.

Then, following heat tolerance tests are conducted by using test pieces of the first embodiment, and comparative examples 1-3.

<Heat Tolerance Test 1>

The test piece (glass sheet) of the first embodiment is heated in an oven at a predetermined temperature for 1 hour, then, a dynamic contact angle (advance contact angle ($\theta_A$) and sweepback contact angle ($\theta_R$)) with respect to water and n-hexadecane is measured and the contact angle hysteresis is calculated.

The contact angles of the test piece (glass sheet) of the first embodiment before and after heated are shown in table 1.

TABLE 1

| | WATER | | | n-HEXADECANE | | |
|---|---|---|---|---|---|---|
| OVEN TEMPERATURE [° C.] | $\theta_A$ [°] | $\theta_R$ [°] | CONTACT ANGLE HYSTERESIS [°] | $\theta_A$ [°] | $\theta_R$ [°] | CONTACT ANGLE HYSTERESIS [°] |
| — | 91 | 84 | 7 | 36 | 30 | 6 |
| 150 | 92 | 85 | 7 | 34 | 30 | 4 |
| 200 | 98 | 87 | 11 | 34 | 30 | 4 |
| 250 | 95 | 83 | 12 | 33 | 28 | 5 |
| 300 | 104 | 93 | 11 | 35 | 31 | 4 |
| 350 | 98 | 88 | 10 | 35 | 31 | 5 |
| 400 | 103 | 92 | 10 | 36 | 30 | 6 |
| 450 | 101 | 92 | 9 | 38 | 34 | 4 |
| 500 | 50 | 30 | 20 | 7 | — | — |

Additionally, "-" shown as "oven temperature" means a state before heated, and "-" shown as "$\theta_A$", "$\theta_R$", and "contact angle hysteresis" means that the contact angle cannot be measured due to reduction of repellency of the water/oil repellant coating film.

<Contact Angle Hysteresis>

The dynamic contact angle (advance contact angle ($\theta_A$) and sweepback contact angle ($\theta_R$)) with respect to water and n-hexadecane is measured by using contact angle measuring device (produced by "KYOWA KAIMEN"). Then, the contact angle hysteresis is calculated according to the following formula.

$$\theta_A - \theta_R$$

<Heat Tolerance Test 2>

The test pieces of the first embodiment, the comparative examples 1 and 2 (glass sheet) are heated in an oven at a predetermined temperature for 24 hour, then, the contact angle hysteresis with respect to water and n-hexadecane is measured.

The contact angles of the test pieces of the first embodiment, the comparative examples 1 and 2 (glass sheet) before and after heated are shown in table 2-table 4.

TABLE 2

| OVEN TEMPERATURE [° C.] | WATER | | | n-HEXADECANE | | |
|---|---|---|---|---|---|---|
| | $\theta_A$ [°] | $\theta_R$ [°] | CONTACT ANGLE HYSTERESIS [°] | $\theta_A$ [°] | $\theta_R$ [°] | CONTACT ANGLE HYSTERESIS [°] |
| — | 91 | 84 | 7 | 36 | 30 | 6 |
| 150 | 97 | 88 | 9 | 36 | 30 | 6 |
| 200 | 101 | 89 | 12 | 34 | 30 | 4 |
| 250 | 102 | 90 | 12 | 39 | 34 | 5 |
| 300 | 103 | 91 | 11 | 38 | 33 | 4 |
| 350 | 105 | 92 | 13 | 39 | 33 | 6 |
| 400 | 81 | 68 | 13 | 29 | — | — |
| 450 | 55 | 16 | 39 | — | — | — |
| 500 | 54 | 27 | 27 | — | — | — |

TABLE 3

| OVEN TEMPERATURE [° C.] | WATER | | | n-HEXADECANE | | |
|---|---|---|---|---|---|---|
| | $\theta_A$ [°] | $\theta_R$ [°] | CONTACT ANGLE HYSTERESIS [°] | $\theta_A$ [°] | $\theta_R$ [°] | CONTACT ANGLE HYSTERESIS [°] |
| — | 107 | 96 | 11 | 28 | 27 | 2 |
| 150 | 82 | 74 | 8 | 13 | — | — |
| 200 | — | — | — | — | — | — |
| 250 | — | — | — | — | — | — |
| 300 | — | — | — | — | — | — |
| 350 | — | — | — | — | — | — |
| 400 | — | — | — | — | — | — |
| 450 | — | — | — | — | — | — |
| 500 | — | — | — | — | — | — |

TABLE 4

| OVEN TEMPERATURE [° C.] | WATER | | | n-HEXADECANE | | |
|---|---|---|---|---|---|---|
| | $\theta_A$ [°] | $\theta_R$ [°] | CONTACT ANGLE HYSTERESIS [°] | $\theta_A$ [°] | $\theta_R$ [°] | CONTACT ANGLE HYSTERESIS [°] |
| — | 106 | 98 | 9 | 59 | 54 | 5 |
| 150 | 108 | 98 | 9 | 59 | 54 | 5 |
| 200 | 103 | 91 | 12 | 55 | 49 | 6 |
| 250 | 96 | 75 | 21 | 52 | 45 | 7 |
| 300 | 81 | 59 | 22 | 47 | 40 | 7 |
| 350 | 26 | — | — | 5 | — | — |
| 400 | — | — | — | — | — | — |
| 450 | — | — | — | — | — | — |
| 500 | — | — | — | — | — | — |

Additionally, "—" shown as "oven temperature" means a state before heated, and "—" shown as "$\theta_A$", "$\theta_R$", and "contact angle hysteresis" means that the contact angle cannot be measured due to reduction of repellency of the water/oil repellant coating film.

According to table 1-table 4, the water/oil repellant coating film of the first embodiment has an excellent heat tolerance, and the capability of the water/oil repellant coating film for removing droplets can be maintained even if the water/oil repellant coating film is exposed to high temperature for long hours. The reason for this property is considered that groups expressed by chemical formula described below exist at the surface.

[math. 22]

On the other hand, in a case of the water/oil repellant coating film of the comparative example 1, groups expressed by chemical formula described below exist at the surface.

[math. 23]

Therefore, the capability of the water/oil repellant coating film for removing droplets cannot be maintained if the water/oil repellant coating film is exposed to high temperature for long hours. Also, water/oil repellency becomes smaller because silanol groups exist at the surface.

Further, in a case of the water/oil repellant coating film of the comparative example 2, groups expressed by chemical formula described below exist at the surface.

[math. 24]

Therefore, the capability of the water/oil repellant coating film for removing droplets cannot be maintained if the water/oil repellant coating film is exposed to high temperature for long hours. Also, water/oil repellency becomes smaller because silanol groups exist at the surface.

<Heat Tolerance Test 3>

The test piece of the first embodiment is dipped in an oil bath at 250° C. for 5 minutes, then being rotated at 5 rpm for 30 hours under the room temperature or 250° C. temperature. m-bis (m-phenoxyphenoxy) benzene (m-5P4E) is used as oil in the oil bath.

Figure 2:
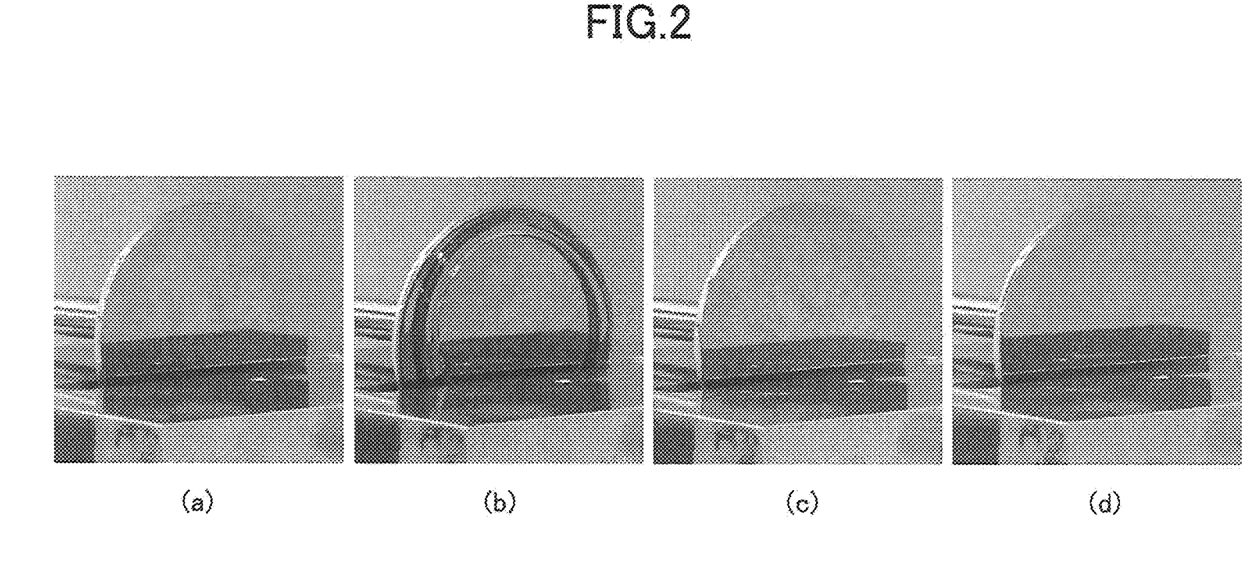
FIG. 2 is a photographic image illustrating a result of heat tolerance test 3 conducted on a test piece (stainless sheet) of the first embodiment.

FIG. 2 is a diagram illustrating results of the heat tolerance test 3 conducted on the test piece of the first embodiment. Additionally, (a), (b), (c), and (d) of FIG. 2 are respectively illustrate a state just after dipped in the oil bath, a state just after rotated under room temperature, a state just after rotated under 250° C., and a state just after rotated under 250° C. for 30 hours.

According to FIG. 2, the water/oil repellant coating film of the first embodiment can maintain cleanliness of the surface since droplet slip-down properties are improved by heating a liquid having high viscosity at room temperature so as to have fluidity.

<Heat Tolerance Test 4>

The dynamic contact angle with respect to water at 25° C. and 230° C. is measured, where droplet of silicone oil is dropped on the test piece (stainless sheet) of the first embodiment under the temperature of 25° C., then being heated up to 230° C. and cooled down to 25° C., and cyclic heating and cooling operation is repeatedly performed.

Figure 3:
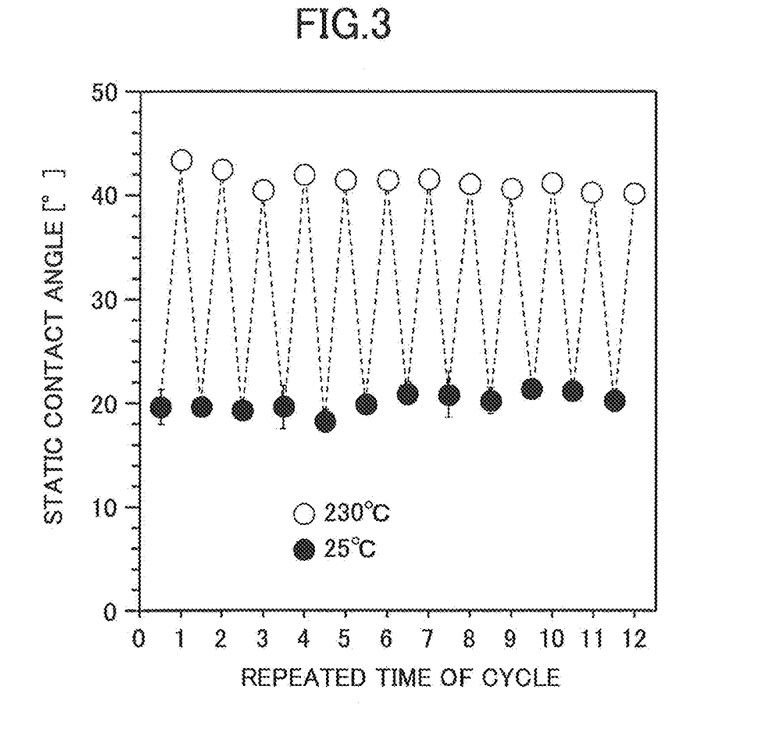
FIG. 3 is a photographic image illustrating a result of heat tolerance test 4 conducted on the test piece (stainless sheet) of the first embodiment.

FIG. 3 is a graph illustrating the result of the heat tolerance test 4.

According to FIG. 3, the droplet slip-down properties and droplet drivability of the water/oil repellant coating film of the first embodiment can be controlled in accordance with temperature change.

<Heat Tolerance Test 5>

Solder containing resin is placed on the surface of the test piece (stainless sheet) of the first embodiment and the test piece of the comparative example 3 that are tilted at 5°, then the test pieces are heated up to 200° C.

Figure 4:
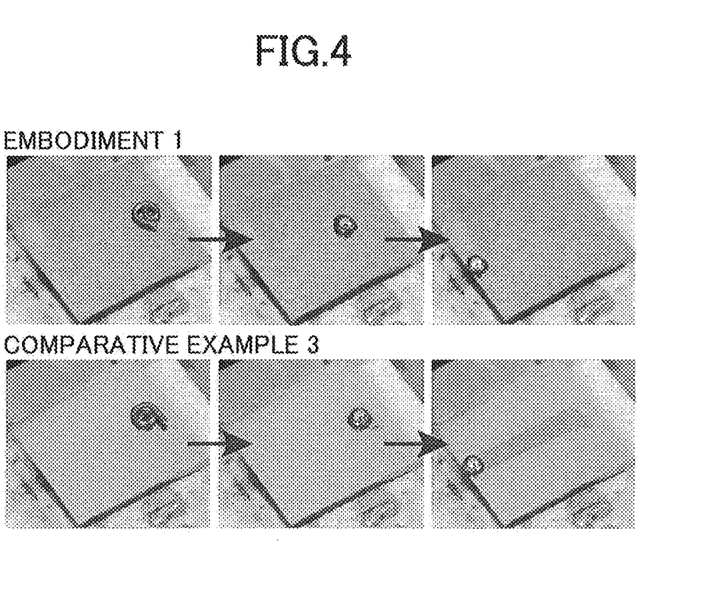
FIG. 4 is a photographic image illustrating a result of heat tolerance test 5 conducted on the test piece (stainless sheet) of the first embodiment and a test piece of comparative example 3.

FIG. 4 is a diagram illustrating results of the heat tolerance test 5 conducted on the test piece (stainless sheet) of the first embodiment and the test piece of the comparative example 3.

According to FIG. 4, the resin dissolved with the solder slips down on the surface of the water/oil repellant coating film of the first embodiment. Such properties are useful for preventing choke in a pipe exposed to high temperature, where the choke is caused by residual droplets or solidified droplets.

In contrast, the resin dissolved with the solder remains on the surface of the test piece of the comparative example 3.

<Heat Tolerance Test 6>

Droplets of m-bis (m-phenoxyphenoxy) benzene (m-5P4E), m-(m-phenoxyphenoxy) diphenyl (m-4P2E), silicone oil PMM-0025 (produced by "GELEST"), and silicone oil PMM-0021 (produced by "GELEST") are dropped on the test piece (stainless sheet) of the first embodiment, and temperature at the surface of the test piece is measured, then, the test piece is tilted to measure the falling angle.

Figure 5:
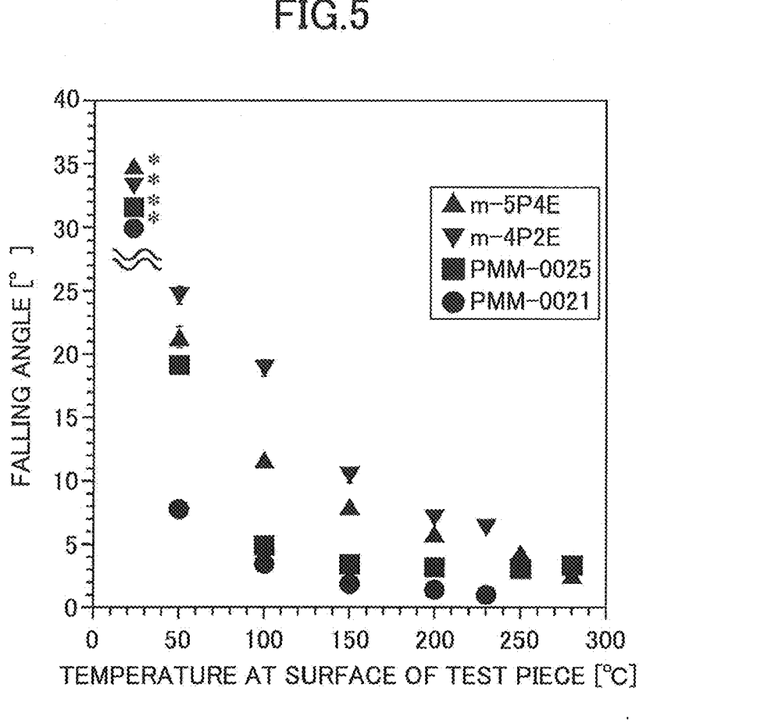
FIG. 5 is a photographic image illustrating a result of heat tolerance test 6 conducted on the test piece (stainless sheet) of the first embodiment.

FIG. 5 is a graph illustrating the result of the heat tolerance test 6 conducted on the test piece (stainless sheet) of the first embodiment.

According to FIG. 5, in the falling angle of the water/oil repellant coating film of the first embodiment, the falling angle decreases as temperature increases, that is, the capability of the water/oil repellant coating film for removing droplets is improved. The reason for this capability is considered that the surface tension and the viscosity of the droplet decrease as the temperature increases.

<Heat Tolerance Test 7>

One side of the test piece of the first embodiment is set at 230° C. while the other side thereof is set at 50° C., and the silicone oil is placed on the one side whose temperature is higher than the other side.

Figure 6:
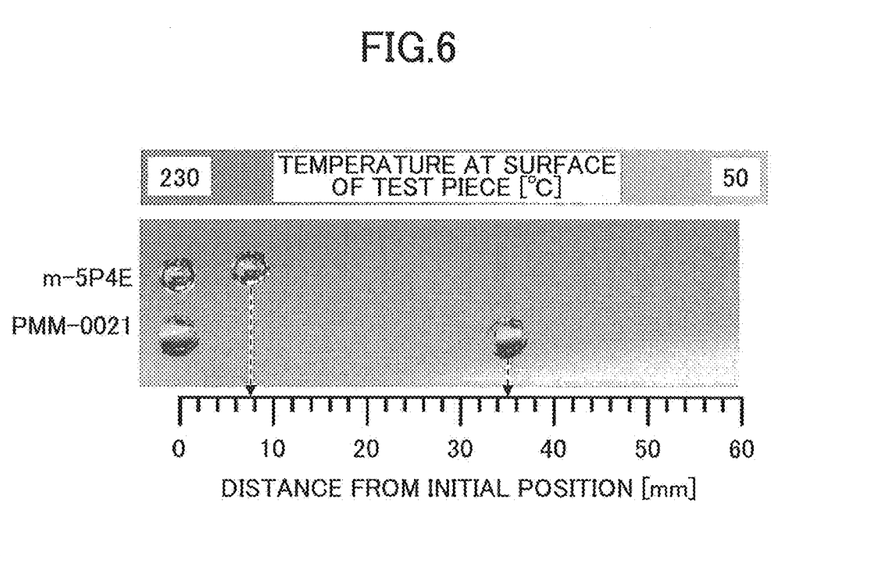
FIG. 6 is a photographic image illustrating a result of heat tolerance test 7 conducted on the test piece (stainless sheet) of the first embodiment.

FIG. 6 is a diagram illustrating the result of the heat tolerance test 7 conducted on the test piece (stainless sheet) of the first embodiment.

According to FIG. 6, the droplet moves on the surface of the water/oil repellant coating film of the first embodiment from the higher temperature side to the lower temperature side. In particular, a moving distance (35 mm) of the silicone oil PMM-0021 (produced by "GELEST") is 3.5 times greater a moving distance (10 mm) of m-bis (m-phenoxyphenoxy) benzene (m-5P4E). It is conceivable that the difference between the moving distances is caused because a temperature dependency of the surface tension is specific to the substance, where the rate of change of the surface tension is smaller in the silicone oil. There have been some reports about voluntary move of the droplet due to temperature gradient. However, the temperatures of the surface at higher temperature side are normally equal to or less than 100° C., and moving distances of the droplets are less than 10 mm in the reported cases. In contrast, in a case of the water/oil repellant coating film of the first embodiment, the voluntary move of the droplets is caused even if the temperature of the surface is greater than or equal to 200° C. because of the excellent heat tolerance of the water/oil repellant coating film. Further, a significant temperature gradient can be applied to the surface of the water/oil repellant coating film of the first embodiment because the water/oil repellant coating film of the first embodiment has heat tolerance of 450° C. at maximum. Therefore, the moving distance of the droplet can be significantly increased in comparison to conventional technologies.

<Heat Tolerance Test 8>

50-times repeated bending is performed on the test piece of the first embodiment (polyimide film) and the test piece of the comparative example 4, then, the test pieces are dipped in an oil bath at 250° C. for 5 minutes. m-bis (m-phenoxyphenoxy) benzene (m-5P4E) is used as oil in the oil bath.

Figure 7:
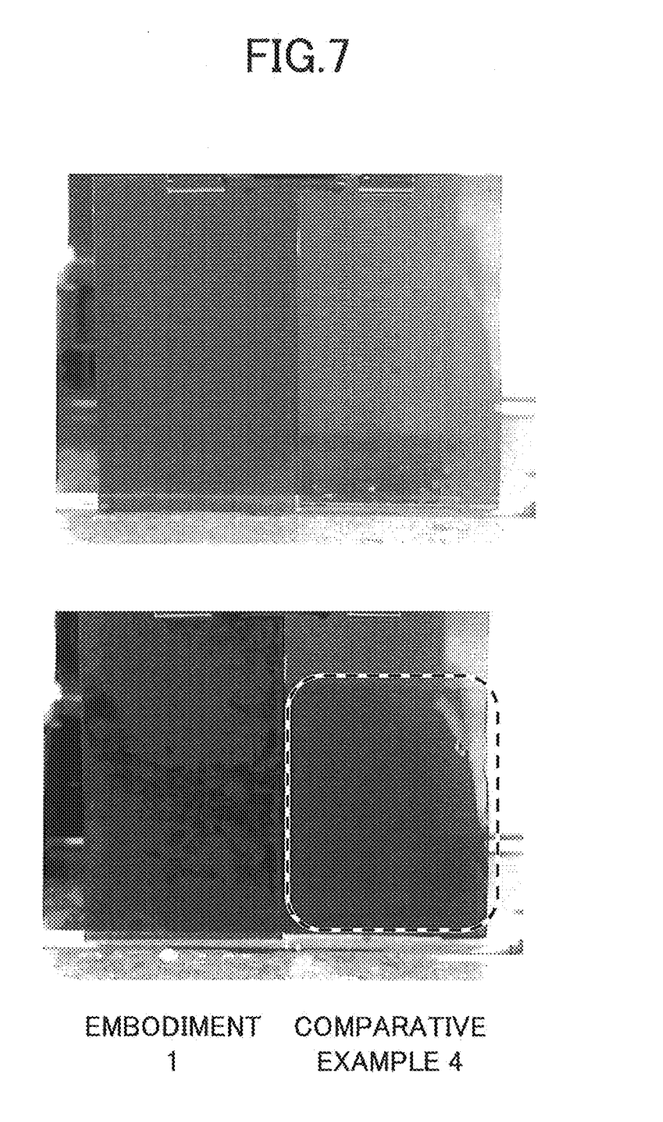
FIG. 7 is a photographic image illustrating a result of heat tolerance test 8 conducted on the test piece (polyimide film) of the first embodiment and a test piece of comparative example 4.

FIG. 7 is a diagram illustrating the result of the heat tolerance test 8 conducted on the test piece (polyimide film) of the first embodiment and the test piece of the comparative example 4.

According to FIG. 7, the water/oil repellant coating film of the first embodiment has an excellent plasticity to improve the droplet slip-down properties, and the cleanliness of the surface can be maintained.

In contrast, the oil for the oil bath adheres to the surface of the test piece of the comparative example 4 (see area surrounded by dotted line).

As described above, the water/oil repellant coating film of the first embodiment has excellent heat tolerance and plasticity to provide the capability for removing the droplets on the surface of the solid object, and further, the droplet slip-down properties and droplet drivability can be controlled in accordance with temperature change or temperature gradient. Therefore, the water/oil repellant coating film of the first embodiment is expected to be applied to a micro channel utilizing thermal droplet transfer, and the like.

Second Embodiment

The precursor solution is produced by mixing 33 parts of methyl triethoxysilane, 5 parts of 0.01M-hydrochloric acid and 62 parts of ethanol, then stirring under room temperature for a predetermined period of time.

A test piece is obtained by coating, in a spin coating method, the precursor solution on a glass sheet, then heating in an oven at 100° C. for 24 hours to form the water/oil repellant coating film whose thickness is 800 nm, and whose root mean square surface roughness Rq is equal to or less than 0.3 nm.

Contact angles of the test piece are shown in table 5.

TABLE 5

| STIRRING TIME [h] | WATER | | | n-HEXADECANE | | |
|---|---|---|---|---|---|---|
| | $\theta_A$ [°] | $\theta_R$ [°] | CONTACT ANGLE HYSTERESIS [°] | $\theta_A$ [°] | $\theta_R$ [°] | CONTACT ANGLE HYSTERESIS [°] |
| 24 | 91 | 86 | 5 | 35 | 33 | 2 |
| 96 | 99 | 85 | 14 | 34 | 27 | 6 |
| 120 | 99 | 85 | 15 | 35 | 29 | 5 |
| 192 | 103 | 92 | 11 | 34 | 28 | 6 |
| 288 | 90 | 87 | 2 | 34 | 26 | 8 |

Embodiment 3

The precursor solution is produced by mixing 3 parts of perhydropolysilazane, 27 parts of dibutyl ether, and N,N,N', N'-tetramethyl hexanediamine (catalytic amount), then adding polyhydroxymethyl siloxane (PHMS) thereto.

A test piece is obtained by coating, in a spin coating method, the precursor solution on a glass sheet, then heating in an oven at 100° C. for 24 hours to form the water/oil repellant coating film whose thickness is 1000 nm and whose root mean square surface roughness Rq is equal to or less than 1 nm.

Contact angles of the test piece are shown in table 6.

TABLE 6

| ADDITION AMOUNT OF PHMS [PART] | WATER | | | n-HEXADECANE | | |
|---|---|---|---|---|---|---|
| | $\theta_A$ [°] | $\theta_R$ [°] | CONTACT ANGLE HYSTERESIS [°] | $\theta_A$ [°] | $\theta_R$ [°] | CONTACT ANGLE HYSTERESIS [°] |
| 0.75 | 102 | 93 | 9 | 26 | 21 | 4 |
| 1.5 | 101 | 94 | 7 | 25 | 20 | 5 |
| 3 | 102 | 98 | 4 | 28 | 25 | 3 |
| 6 | 100 | 95 | 5 | 32 | 28 | 4 |

Then, the test piece is heated in the oven at 300° C. for 24 hours.

Contact angles of the test piece that has been heated are shown in table 7.

TABLE 7

| ADDITION AMOUNT OF PHMS [PART] | WATER | | | n-HEXADECANE | | |
|---|---|---|---|---|---|---|
| | $\theta_A$ [°] | $\theta_R$ [°] | CONTACT ANGLE HYSTERESIS [°] | $\theta_A$ [°] | $\theta_R$ [°] | CONTACT ANGLE HYSTERESIS [°] |
| 0.75 | 94 | 87 | 7 | 27 | 21 | 7 |
| 1.5 | 96 | 82 | 14 | 22 | 22 | 0 |
| 3 | 98 | 85 | 13 | 30 | 27 | 3 |
| 6 | 95 | 84 | 12 | 29 | 28 | 1 |

Embodiment 4

The precursor solution is produced by mixing a predetermined amount of dimethyl diethoxy silane (DMDES), a predetermined amount of tetraethoxysilane (TEOS), 5 parts of 0.01M-hydrochloric acid, and 62 parts of ethanol, then stirring under room temperature for 24 hours.

A test piece is obtained by coating, in a spin coating method, the precursor solution on a glass sheet, then heating in an oven at 100° C. for 24 hours to form the water/oil repellant coating film whose thickness is 1000 nm and whose root mean square surface roughness Rq is equal to or less than 1 nm.

Contact angles of the test piece are shown in table 8.

TABLE 8

| ADDITION AMOUNT OF DMDES [PART] | ADDITION AMOUNT OF TEOS [PART] | WATER | | | n-HEXADECANE | | |
|---|---|---|---|---|---|---|---|
| | | $\theta_A$ [°] | $\theta_R$ [°] | CONTACT ANGLE HYSTERESIS [°] | $\theta_A$ [°] | $\theta_R$ [°] | CONTACT ANGLE HYSTERESIS [°] |
| 29 | 4 | 101 | 91 | 9 | 39 | 34 | 6 |
| 25 | 8 | 101 | 93 | 8 | 40 | 34 | 6 |
| 20 | 13 | 101 | 93 | 8 | 41 | 33 | 7 |
| 12 | 21 | 99 | 88 | 11 | 35 | 31 | 5 |
| 7 | 26 | 96 | 85 | 11 | 38 | 31 | 7 |

Then, the test piece is heated in the oven at 300° C. for 24 hours.

Contact angles of the test piece that has been heated are shown in table 9.

TABLE 9

| ADDITION AMOUNT OF DMDES [PART] | ADDITION AMOUNT OF TEOS [PART] | WATER | | | n-HEXADECANE | | |
|---|---|---|---|---|---|---|---|
| | | $\theta_A$ [°] | $\theta_R$ [°] | CONTACT ANGLE HYSTERESIS [°] | $\theta_A$ [°] | $\theta_R$ [°] | CONTACT ANGLE HYSTERESIS [°] |
| 29 | 4 | 106 | 97 | 10 | 36 | 32 | 4 |
| 25 | 8 | 108 | 98 | 10 | 36 | 31 | 5 |
| 20 | 13 | 108 | 97 | 11 | 36 | 32 | 4 |
| 12 | 21 | 106 | 94 | 12 | 34 | 27 | 7 |
| 7 | 26 | 99 | 86 | 13 | 33 | 26 | 7 |

Fifth Embodiment

The test piece is obtained by exposing a silicon wafer heated at 80° C. to vapor of tetracyclotetramethylsiloxane for 24 hours.

Then, the test piece is heated in the oven at 300° C. for 24 hours.

Contact angles of the test piece before and after heated are shown in table 10.

TABLE 10

| OVEN TEMPERATURE [° C.] | WATER | | | n-HEXADECANE | | |
|---|---|---|---|---|---|---|
| | $\theta_A$ [°] | $\theta_R$ [°] | CONTACT ANGLE HYSTERESIS [°] | $\theta_A$ [°] | $\theta_R$ [°] | CONTACT ANGLE HYSTERESIS [°] |
| — | 101 | 99 | 2 | 37 | 35 | 3 |
| 300 | 92 | 86 | 7 | 30 | 24 | 7 |

Additionally, "-" shown as "oven temperature" means a state before heated.

Sixth Embodiment

The test piece is obtained by exposing a silicon wafer heated at 80° C. to vapor of methyl triethoxysilane for 24 hours.

Then, the test piece is heated in the oven at 300° C. for 24 hours.

Contact angles of the test piece before and after heated are shown in table 11.

TABLE 11

| OVEN TEMPERATURE [° C.] | WATER | | | n-HEXADECANE | | |
|---|---|---|---|---|---|---|
| | $\theta_A$ [°] | $\theta_R$ [°] | CONTACT ANGLE HYSTERESIS [°] | $\theta_A$ [°] | $\theta_R$ [°] | CONTACT ANGLE HYSTERESIS [°] |
| — | 104 | 96 | 8 | 53 | 46 | 8 |
| 300 | 75 | 65 | 10 | 37 | 28 | 9 |

Additionally, "-" shown as "oven temperature" means a state before heated.

Seventh Embodiment

The precursor solution is produced by mixing a predetermined amount of trimethyletoxysilane (TMES), a predetermined amount of tetraethoxysilane (TEOS), 5 parts of 0.01M-hydrochloric acid, and 62 parts of ethanol, then stirring under room temperature for 24 hours.

A test piece is obtained by coating, in a spin coating method, the precursor solution on a glass sheet, then heating in an oven at 100° C. for 24 hours.

Contact angles of the test piece are shown in table 12.

TABLE 12

| ADDITION AMOUNT OF TMES [PART] | ADDITION AMOUNT OF TEOS [PART] | WATER | | | n-HEXADECANE | | |
|---|---|---|---|---|---|---|---|
| | | $\theta_A$ [°] | $\theta_R$ [°] | CONTACT ANGLE HYSTERESIS [°] | $\theta_A$ [°] | $\theta_R$ [°] | CONTACT ANGLE HYSTERESIS [°] |
| 19 | 14 | 97 | 93 | 4 | 97 | 93 | 4 |
| 12 | 21 | 95 | 92 | 3 | 39 | 33 | 6 |
| 7 | 26 | 100 | 92 | 9 | 40 | 36 | 4 |

Then, the test piece is heated in the oven at 250° C. for 24 hours.

Contact angles of the test piece that has been heated are shown in table 13.

TABLE 13

| ADDITION AMOUNT OF TMES [PART] | ADDITION AMOUNT OF TEOS [PART] | WATER | | | n-HEXADECANE | | |
|---|---|---|---|---|---|---|---|
| | | $\theta_A$ [°] | $\theta_R$ [°] | CONTACT ANGLE HYSTERESIS [°] | $\theta_A$ [°] | $\theta_R$ [°] | CONTACT ANGLE HYSTERESIS [°] |
| 19 | 14 | 65 | 51 | 14 | 31 | 27 | 4 |
| 12 | 21 | 87 | 72 | 16 | 30 | 24 | 6 |
| 7 | 26 | 96 | 91 | 5 | 37 | 31 | 6 |

Comparative Example 5

The precursor solution is produced by mixing a 21 parts of tetraethoxysilane, 5 parts of phenyltriethoxysilane, 64 parts of ethanol, and 4 parts of 0.01M-hydrochloric acid, then stirring under room temperature for 24 hours.

A test piece is obtained by coating, in a spin coating method, the precursor solution on a glass sheet, then being placed under room temperature for 24 hours to form the water/oil repellant coating film whose thickness is 1000 nm and whose root mean square surface roughness Rq is 0.90 nm.

Then, the test piece is heated in the oven at 350° C. for 24 hours.

Contact angles of the test piece before and after heated are shown in table 14.

TABLE 14

| OVEN TEMPERATURE [° C.] | $\theta_A$ [°] | $\theta_R$ [°] | CONTACT ANGLE HYSTERESIS [°] |
|---|---|---|---|
| — | 77 | 66 | 11 |
| 350 | 60 | 20 | 40 |

Additionally, "-" shown as "oven temperature" means a state before heated.

The present application is based on Japanese Priority Application No. 2014-032316 filed on Feb. 21, 2014, the entire contents of which are hereby incorporated herein by reference.

The invention claimed is:

1. A water/oil repellant coating film formed on a surface of a solid object water/oil repellant coating film comprising:
    a three-dimensional crosslinking structure formed only by siloxane bonds, wherein the three-dimensional crosslinking structure of the water/oil repellant coating film is terminated with functional groups selected from a group consisting of a methyl group, an alkoxy group and a hydroxyl group in combination thereof, and
    a mole ratio of alkoxy groups and hydroxyl groups with respect to the methyl groups existing on the surface of the water/oil repellant coating film is equal to or less than 0.1, wherein
    a root mean square surface roughness Rq of the water/oil repellant coating film is equal to or less than 50 nm.

2. The water/oil repellant coating film according to claim 1, wherein
    the water/oil repellant coating film is chemically bound with the surface of the solid object.

* * * * *